F. W. BACON.
VEGETABLE WASHER.

No. 48,477.   Patented June 27, 1865.

Witnesses:
Henry T. Brown
J. W. Coombs

Inventor:
F. W. Bacon

UNITED STATES PATENT OFFICE.

F. W. BACON, OF NEW YORK, N. Y., ASSIGNOR TO THE NEW YORK DESICCATING COMPANY OF NEW YORK.

IMPROVED VEGETABLE-WASHER.

Specification forming part of Letters Patent No. 48,477, dated June 27, 1865.

*To all whom it may concern:*

Be it known that I, F. W. BACON, of the city, county, and State of New York, have invented a new and Improved Machine for Washing Vegetables; and I do hereby declare that the following is a full, clear, and exact description of the same, reference being had to the accompanying drawings, forming part of this specification, in which—

Figure 2:
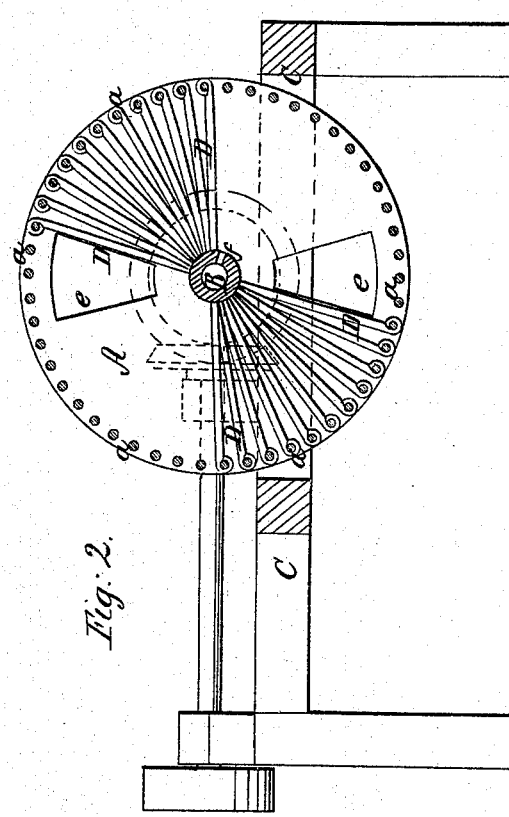
Figure 1:
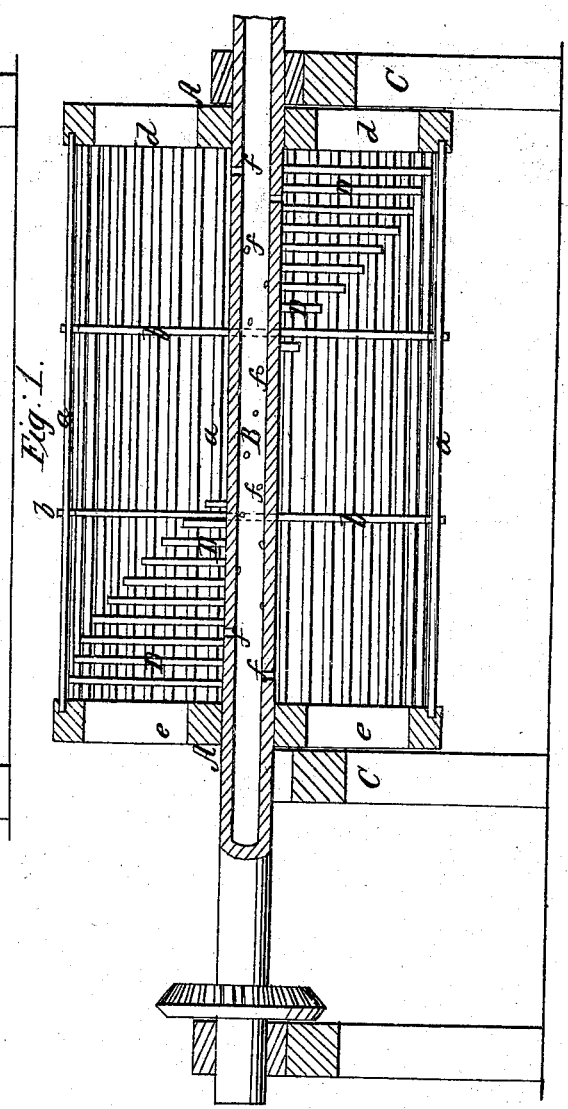

Figure 1 is a central longitudinal vertical section of the machine. Fig. 2 is a transverse vertical section of the same.

Similar letters of reference indicate corresponding parts in both figures.

This machine is composed of a rotating cylindrical cage containing one or more spirally-formed grates, extending from end to end and from the central shaft to the circumference, for the purpose of producing a movement of the vegetables from one end of the cage to the other as it rotates in a tank of water.

The principal feature of novelty in the machine consists in its having a hollow central shaft extending right through the cage, and perforated at short intervals from end to end thereof, for the purpose of throwing among the vegetables, in numerous streams, clean water received through a pipe entering one end of the shaft.

To enable others to make and use my invention, I will proceed to describe it with reference to the drawings.

The rotating cage is composed of two circular heads, A A, of iron or wood, united by longitudinal wires or rods $a\ a$, arranged in the form of a cylinder and strengthened at intervals by bands $b\ b$. The heads A A are firmly secured to the hollow central horizontal shaft, B, which extends right through the cage and is supported in suitable bearings in a frame, C. The spirally-formed grates D D, of which two are represented, are composed of rods or wires arranged radially to the shaft, and each connected at one end with the shaft and at the other with the rods or wires $a\ a$ of the cage. These grates extend from one end to the other, and the interstices between its rods or wires are, like those between the wires or rods of the cage, of such width that the vegetables to be washed cannot pass between them.

There are one or more openings, $d\ d$, in one of the heads A A, for the introduction of the vegetables, and one or more openings, $e\ e$, at the other end for their removal after the washing operation. These openings may be provided with suitable doors or shutters.

The hollow central shaft, B, is open at one end for the entrance of a stationary pipe, through which the clean water for washing is admitted into the said shaft, to issue in numerous small jets or streams from the perforations $f\ f$ in that portion of the shaft between the heads of the cage. The stationary pipe should enter the open end of the shaft through a stuffing-box.

Rotary motion is given to the central shaft, B, to produce the rotary motion of the cage, either by hand or by any proper system of gearing or belts and pulleys deriving motion from a steam-engine or other motor, and the vegetables introduced at one end of the cage are slowly carried toward the other end as they are lifted up by the wires or rods $a\ a$ and thrown upon the spiral grates, which form inclined planes, down which they roll obliquely to the axis of the cylinder while subject to the washing action of the numerous streams or jets of water issuing from the perforations $f\ f$ of the hollow shaft.

The cage should preferably be arranged over a tank in which water is kept to such a depth that the lower part of the cylinder is always immersed.

What I claim as my invention, and desire to secure by Letters Patent, is—

The hollow perforated shaft B, receiving water at one end and delivering it in numerous jets or streams from its perforations, in combination with the revolving cylindrical cage and the spiral grate or grates, or their equivalent, arranged between the said shaft and the circumference of the cage, substantially as herein described.

F. W. BACON.

Witnesses:
HENRY T. BROWN,
J. W. COOMBS.